United States Patent
Mathias et al.

(10) Patent No.: US 6,824,909 B2
(45) Date of Patent: Nov. 30, 2004

(54) LOW-HUMIDIFICATION AND DURABLE FUEL CELL MEMBRANE

(75) Inventors: Mark F. Mathias, Pittsford, NY (US); Hubert A. Gasteiger, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 175 days.

(21) Appl. No.: 10/191,919

(22) Filed: Jul. 9, 2002

(65) Prior Publication Data

US 2004/0009384 A1 Jan. 15, 2004

(51) Int. Cl.[7] .............................. H01M 8/10; H01M 8/02
(52) U.S. Cl. .......................................... 429/33; 521/27
(58) Field of Search ........................... 429/30, 33, 320; 252/62.2; 521/27

(56) References Cited

U.S. PATENT DOCUMENTS

| | | | |
|---|---|---|---|
| 5,447,636 A | * | 9/1995 | Banerjee ..................... 210/638 |
| 5,523,181 A | | 6/1996 | Stonehart et al. |
| 5,766,787 A | | 6/1998 | Watanabe et al. |
| 6,117,581 A | * | 9/2000 | Shelef ......................... 429/44 |

* cited by examiner

Primary Examiner—Susy Tsang-Foster
(74) Attorney, Agent, or Firm—Cary W. Brooks, Esq.; Linda M. Deschere, Esq.

(57) ABSTRACT

A low humidification and durable fuel cell membrane is provided with water adsorbing material embedded therein in order to adsorb water under wet conditions and provide a reservoir of water to keep the membrane irrigated under dry conditions. A hydrogen oxidation catalyst is provided on the water adsorbing material which will catalyze the reaction of hydrogen and oxygen that are crossing through the membrane and will serve to irrigate the membrane and keep the water adsorbing material full of water. Accordingly, the humidification requirements to a fuel cell stack in an operating system are reduced.

37 Claims, 2 Drawing Sheets

LOW-HUMIDIFICATION AND DURABLE FUEL CELL MEMBRANE

FIELD OF THE INVENTION

The present invention relates to fuel cell systems for producing electricity from an electrochemical reaction, and more particularly to a low humidification membrane of such fuel cell systems.

BACKGROUND OF THE INVENTION

Fuel cell systems often include fuel processors that produce hydrogen from hydrocarbon fuel. Fuel cell systems typically include a plurality of fuel cells that produce electricity from the conversion of electrochemical energy resulting from the reaction of reducing and oxidizing agents (e.g., hydrogen and an oxidant).

Fuel cells have been used as a power source in many applications and can provide improved efficiency, reliability, durability, cost and environmental benefits over other sources of electrical energy. As a result of the improved operation of these fuel cells over other sources of energy, and in particular, the reduced emissions (i.e., practically zero harmful emissions), electric motors powered by fuel cells for use in cars and other vehicles to replace internal combustion engines are very attractive.

One common type of fuel cell is a proton exchange membrane (PEM) fuel cell, which employs a thin polymer membrane that is permeable to protons, but not electrons. The membrane in the PEM fuel cell is part of a membrane electrode assembly (MEA) having an anode on one face of the membrane and a cathode on the opposite face. The membrane is typically made from an ion exchange resin such as a perfluoronated sulfonic acid. The MEA is sandwiched between a pair of electrically conductive elements that serve as current collectors for the anode and cathode, and contain appropriate channels and/or openings for distribution of the gaseous reactants of the fuel cell over the surfaces of the respective anode and cathode catalysts.

In PEM fuel cells, hydrogen ($H_2$) is the anode reactant (i.e., fuel) and oxygen is the cathode reactant (i.e., oxidant). The oxygen can be either a pure form (i.e., $O_2$), or air (i.e., a mixture of $O_2$ and $N_2$), or $O_2$ in combination with other gases. The anode and cathode typically comprise finely divided catalytic particles supported on carbon particles, and admixed with a proton conductive resin. The catalytic particles are typically precious metal particles, such as, for example, platinum.

These MEAs also require controlled operating conditions in order to improve operation efficiency and prevent degradation of the membrane and catalysts. These operating conditions include proper water management and humidification. In particular, if a proper moisture level of the electrolyte membrane is not maintained, cell performance is affected (i.e., proton conductivity is reduced and the current produced by the cell drops). Failure to control water levels of the membrane may prevent the membrane from properly conducting hydrogen ions, thereby resulting in a drop in power produced by the fuel cell. For example, if the cell is too dry, protonic conductivity is reduced. Conversely, if liquid water remains in the fuel cell at the cathode, oxygen is unable to penetrate the water remaining and reach the cathode catalyst, thereby also reducing fuel cell performance.

Prior fuel cell systems typically utilize an externally humidified air stream to maintain the proper moisture level of the membranes of the MEA. However, providing water to the stack is costly from a system point of view, and it is desirable to supply as little water as possible in order to minimize system complexity and cost.

SUMMARY OF THE INVENTION

Accordingly, the present invention provides adsorbent particles embedded in the membrane which adsorb water under wet conditions and provide a reservoir of water to keep the membrane irrigated under dry conditions. Thus, the water adsorbing particles allow the fuel cell to survive periods of "inlet-stream draught" without excessive loss in conductivity. A hydrogen oxidation catalyst is supported on the water adsorbent material in order to catalyze the reaction of hydrogen and oxygen that are crossing through the membrane. This reaction forms water and will serve to irrigate the water adsorbent particles provided within the membrane. With the present invention, humidification requirements of a fuel cell stack in an operating system will be reduced. This will result in reduction or elimination of humidification equipment and the reduction or elimination of condensing requirements downstream of the stack. System complexity and cost are also substantially decreased. Fuel cell stack response to periods of low-inlet-stream humidity will be greatly improved while membrane durability will also be improved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A PEM (proton exchange membrane, also called polymer electrolyte membrane) fuel cell uses a simple chemical process to combine hydrogen and oxygen into water while producing electric current in the process. At the anode, the hydrogen molecules give up electrons and form hydrogen ions, a process which is made possible by a catalyst. The electrons travel to the cathode through an external circuit producing electrical current. This current can perform useful work by powering an electrical device. The proton exchange membrane allows protons to flow through, but stops electrons from passing through it. As a result, while the electrons flow through an external circuit, the hydrogen ions flow directly through the proton exchange membrane to the cathode, where they combine with oxygen molecules and the electrons to form water. Thus, hydrogen fuels' natural tendency to oxidize and form water is utilized to produce electricity which is then used for work. No pollution is produced, and the only resulting products are water and heat.

Figure 1:
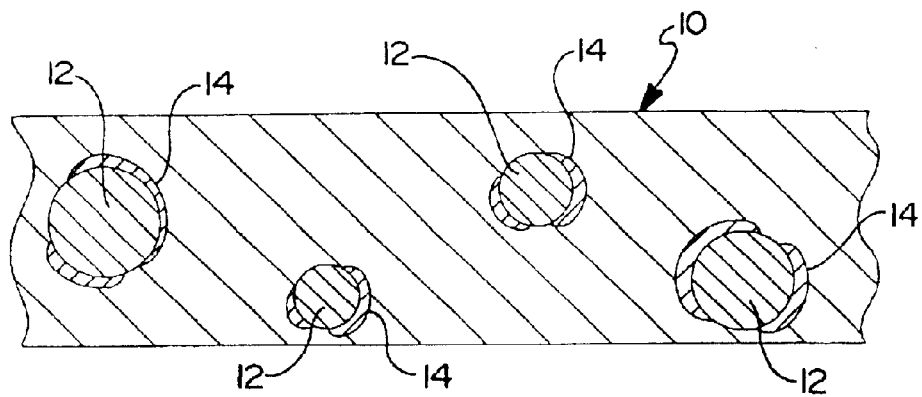
FIG. 1 is a schematic cross-sectional view of a low-humidification fuel cell membrane according to the principles of the present invention.

As shown in FIG. 1, a schematic cross-sectional view of a low-humidification fuel cell membrane 10, according to the principles of the present invention, is provided. The membrane 10 can be made from, for example, perfluorocarbon sulfonic acid, polysulfones, perfluorocarbonic acid, and styrene-divinylbenzene sulfonic acid. Water adsorbing material 12 is embedded within the membrane 10. According to a preferred embodiment, silica/alumina particles are used for the water adsorbing material. An ideal silica/alumina comes from the zeolite family of materials with very high water adsorbing capacity. Examples of zeolite materials include Zeolite A (Advera 401 [PQ Corporation]), Zeolite X (Aldrich 28-359-2), and Zeolite Y [Aldrich 33, 441-3]. A hydrogen oxidation catalyst 14 is supported on the water adsorbing material 12. The hydrogen oxidation catalyst can be supported on or within the structure of the adsorbing material 12.

Figure 2:
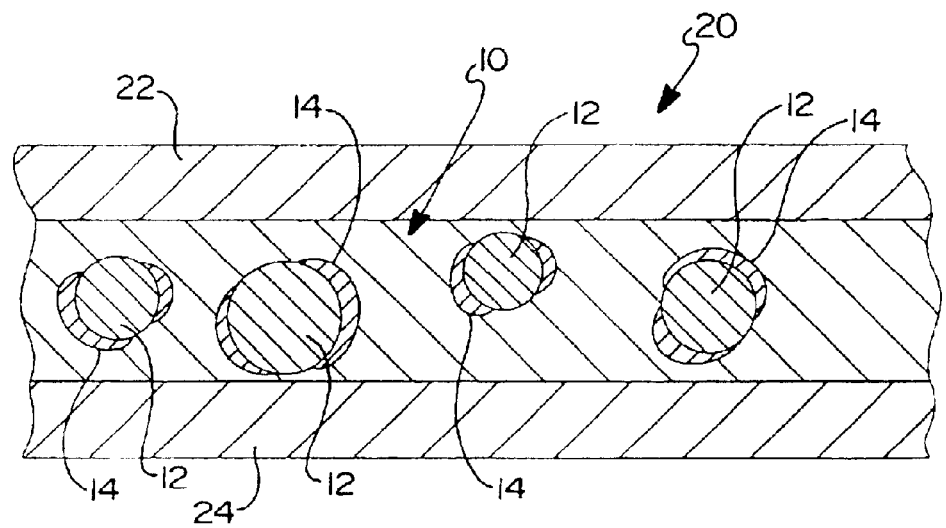
FIG. 2 is a schematic cross-sectional view of an alternative low-humidification fuel cell membrane according to the principles of the present invention.

The water adsorbing material 12 will adsorb water under wet conditions and provide a reservoir of water to keep the membrane 10 irrigated under dry conditions. Thus, the water adsorbing material 12 will allow the fuel cell to survive periods of "inlet-stream drought" without excessive loss in conductivity. Preferably, the water adsorbing particles 12 are smaller than the membrane thickness so that reaction gasses do not leak from the anode to cathode compartment along a string of particles. An optimal membrane thickness for an automotive application is likely in the range of 10–50 microns, while the water adsorbing particles 12 are preferably smaller than 5 microns. Typically, the particle diameter would be approximately ten times smaller than membrane thickness (note: the particles in FIGS. 1 and 2 are not shown to scale for purposes of illustration).

The hydrogen oxidation catalyst 14 can include platinum, gold, palladium, rhodium, iridium, and ruthenium used either alone or in combination. Preferably, platinum is used with very high dispersion (i.e., Pt surface area/gm of Pt). The hydrogen oxidation catalyst 14 within the membrane will catalyze the reaction of hydrogen and oxygen that are crossing through the membrane 10. This reaction forms water and will serve to irrigate the membrane 10 and keep the water adsorbing material 12 full of water. Furthermore, including an oxidation catalyst 14 in the membrane 10 will shut down one of the well known decay mechanisms in these kinds of fuel cells involving the reaction of cross-over oxygen on the anode to form peroxide which subsequently attacks and degrades the polymer membrane backbone. To maximize the benefit of the hydrogen oxidation catalyst, it should be present in very high dispersion (i.e., catalyst surface area/gm of catalyst) and the high dispersion should be maintained over the lifetime of the membrane. When a zeolite is used as the water adsorbing material, the hydrogen oxidation catalyst can be positioned within the cages of the zeolite. Deposition of the catalyst in the high surface area cages will provide for a good dispersion of the catalyst and will prevent the catalyst from growing to form particles that are larger than the zeolite cages (between 3–10 Angstroms).

For example, when a fuel cell running at high temperature and pressure is moved to an operating point at low temperature and pressure, the low pressure may be arrived at quickly. However, it would likely take longer for the lower temperature to be established due to the fuel cell heat capacity. The fuel cell would tend to dry out while the temperature is decreasing to the lower steady-state value, and the membrane, according to the present invention, would mitigate that effect.

Figure 3:
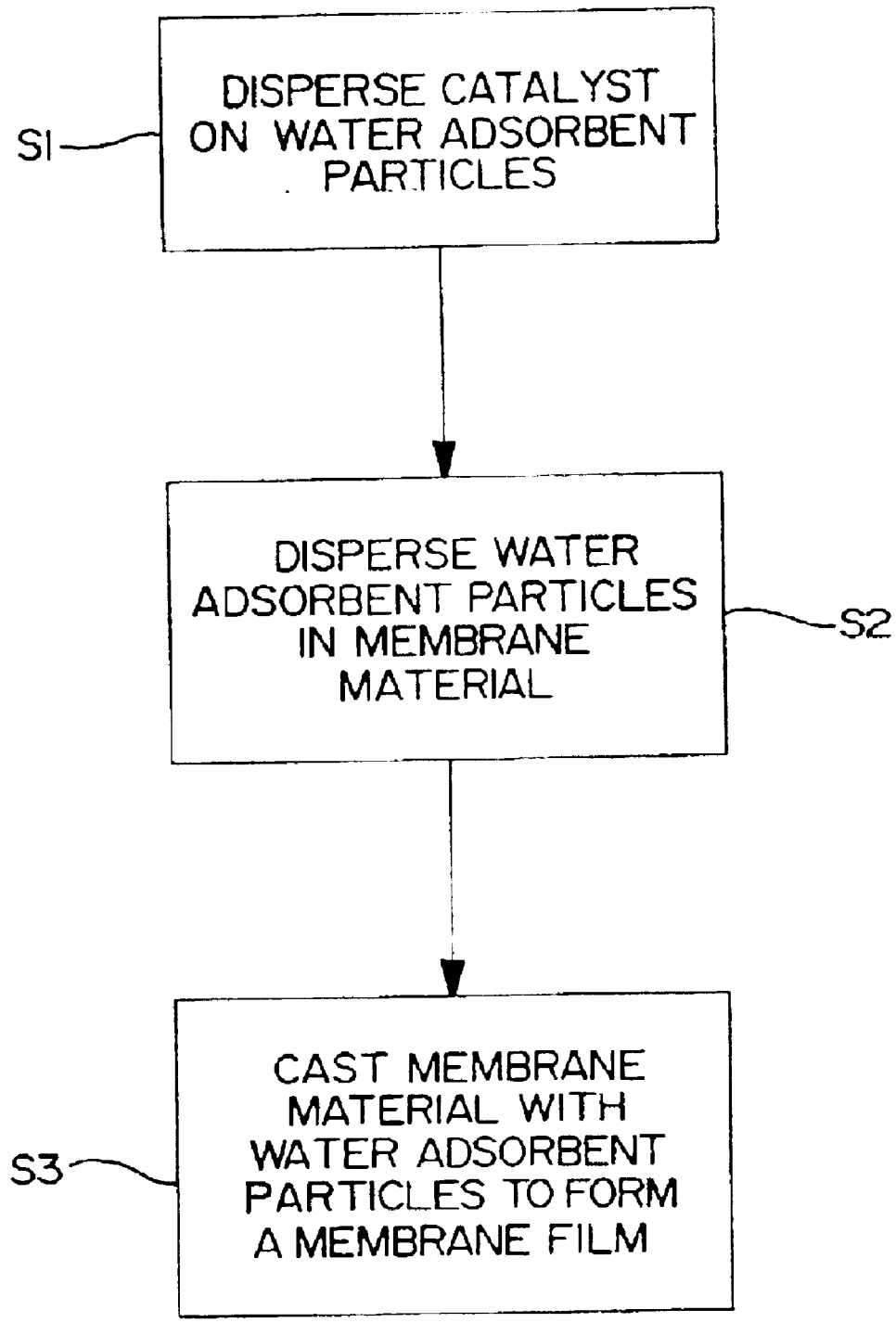
FIG. 3 is a flow diagram illustrating the method steps for making the low-humidification fuel cell membrane according to the principles of the present invention.

The membrane 10 of the present invention is preferably formed by casting and dispersing the water adsorbing material 12 with the hydrogen oxidation catalyst 14 supported thereon within the membrane 10. Casting may allow for production of thinner membranes than does extrusion and it provides a convenient way to disperse the hydrogen oxidation catalyst/water adsorbing material (14/12) throughout the membrane 10. As shown in FIG. 3, step S1 includes dispersing the catalyst 14 on the water adsorbent particles 12. Subsequently, the water adsorbent particles 12 are dispersed in the membrane material (step S2), and the membrane material is cast with the water adsorbent particles 12 to form the membrane film 10 (step S3). With the present invention, the water adsorbent particles 12 with the hydrogen oxidation catalyst 14 supported thereon can be embedded throughout the membrane structure 10 as schematically illustrated in FIG. 1.

According to a preferred embodiment, platinum is deposited into a zeolite cage via an ion exchange process. In this process, platinum containing cations (i.e., Pt tetraamine in a salt form, e.g. from the nitrate or chloride salt) are brought in contact with the zeolite in an aqueous slurry. The platinum cations enter the zeolite cages and anchor at ion-exchange sites, also known as acid sites. These ion-exchange sites are based on negatively charged sites in the zeolite framework, and they require the presence of a cation at all times to obey the physical law of electro-neutrality. In order to get maximum uptake of the platinum, it is important for the zeolite ion-exchange sites to be neutralized with protons when the platinum incorporation step is attempted. This is because the platinum cations interact more strongly with the sites than the protons, and therefore, readily exchange into an anchor on the zeolite.

Zeolites are usually obtained in the sodium form (i.e., ion-exchange sites and zeolite neutralized with sodium ions). Prior to platinum incorporation, these sites must be put into the hydrogen form through an ammonium exchange process in which the sodium ions are replaced with ammonium ions. This is followed by an air calcination in which ammonia is evolved, leaving protons behind to neutralize the ion-exchange site. Then the platinum ion-exchange is conducted in order to get cationic platinum species to exchange into the zeolite. Finally, a heat-treatment is conducted to reduce the platinum containing ion to platinum metal, the active form that catalyzes hydrogen oxidation. After the platinum is deposited in the zeolite, these powders can be incorporated into the membranes using processes such as casting or extrusion.

An alternative design of the present invention isolates the water adsorbent particles 12 to a central layer in the membrane 20 as shown in FIG. 2. This is accomplished by laminating a membrane 10 such as the one shown and described in FIG. 1 with two homogeneous water adsorbent material-free cast membranes 22, 24. This configuration ensures that gas crossover through the membrane structure is held to an acceptable level.

With the present invention, humidification requirements of a fuel cell stack in an operating system can be reduced. This will result in the reduction or elimination of humidification requirements and the reduction or elimination of condensing requirements downstream of the stack. System complexity and costs are substantially decreased. Fuel cell stack response to periods of low-inlet-stream humidity is greatly improved. In addition, membrane durability is also improved. By combining the water adsorbing material and a catalyst into particles later incorporated into the membrane, the water produced is in intimate contact with the water adsorbent material and maintains its water adsorption capacity as full as possible. Thus, the catalyst 14 maximizes the reservoir effect of the water adsorbing material 12. The pore size can be chosen so that the hydrogen oxidation catalyst will be supported either on the outside of the crystals or within the crystals of the water adsorbing material, wherever it most efficiently contacts the hydrogen and oxygen.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A proton exchange membrane for a fuel cell, comprising:
   a membrane film;
   water adsorbent particles embedded in said membrane film; and
   a hydrogen oxidation catalyst supported on said water adsorbent particles, wherein the water adsorbent particles comprise zeolite.

2. The membrane of claim 1, wherein the water adsorbent particles comprise ion-exchanged zeolite having said catalyst at a first plurality of ion-exchange sites.

3. The membrane of claim 2, having hydrogen at a second plurality of said ion-exchange sites.

4. The membrane of claim 1, wherein said water adsorbent particles are smaller than said membrane film thickness.

5. The membrane of claim 1, wherein said hydrogen oxidation catalyst is platinum.

6. The membrane of claim 1, wherein said hydrogen oxidation catalyst is selected from the group consisting of platinum, gold, palladium, rhodium, iridium and ruthenium and mixtures thereof.

7. The membrane of claim 1, wherein said membrane film is selected from the group consisting of perfluorocarbon sulfonic acid, polysulfones, perfluorocarbonic acid and styrene-divinylbenzene sulfonic acid.

8. The membrane of claim 1, further comprising a water adsorbent-free membrane layer on at least one face of said membrane film.

9. The membrane of claim 1, further comprising a water adsorbent-free membrane layer on each face of said membrane film.

10. The membrane of claim 1, wherein said water adsorbent particles are up to 3 microns in size.

11. A method of making a proton exchange membrane, comprising the steps of:
    dispersing a hydrogen oxidation catalyst on a plurality of water adsorbent particles comprising zeolite; and
    casting said water adsorbent particles in a membrane film.

12. The method according to claim 11, further comprising the steps of laminating a water adsorbent-free membrane layer on each face of said membrane film.

13. The method according to claim 11, wherein said zeolite is an ion-exchange zeolite, where said catalyst occupies a plurality of ion-exchange sites of said zeolite.

14. The method according to claim 13, wherein said ion-exchange zeolite is prepared by rendering a plurality of said ion-exchange sites to a hydrogen form and then rendering a plurality of said hydrogen from sites to said catalyst form.

15. The method according to claim 11, wherein said water adsorbent particles are smaller than said membrane film thickness.

16. The method according to claim 11, wherein said hydrogen oxidation catalyst is platinum.

17. The method according to claim 11, wherein said hydrogen oxidation catalyst is selected from the group consisting of platinum, gold, palladium, rhodium, iridium and ruthenium.

18. The method according to claim 11, wherein said membrane film is selected from the group consisting of perfluorocarbon sulfonic acid, polysulfones, pertfluorocarbonic acid and styrene-divinylbenzene sulfonic acid.

19. The membrane of claim 11, wherein said water adsorbent particles are up to 3 microns in size.

20. A proton exchange membrane for a fuel cell, comprising:
    a membrane film;
    water adsorbent particles embedded in said membrane film; and
    a hydrogen oxidation catalyst supported on said water adsorbent particles, wherein the membrane film thickness is about 10 times greater than a size of said particles.

21. The membrane of claim 20, wherein said water adsorbent particles include silica/alumina.

22. The membrane of claim 21, wherein said silica/alumina is a zeolite.

23. The membrane of claim 20, wherein said membrane film thickness is about 10–50 microns.

24. The membrane of claim 20, wherein said hydrogen oxidation catalyst is platinum.

25. The membrane of claim 20, wherein said hydrogen oxidation catalyst is selected from the group consisting of platinum, gold, palladium, rhodium, iridium and ruthenium and mixtures thereof.

26. The membrane of claim 20, wherein said membrane film is selected from the group consisting of perfluorocarbon sulfonic acid, polysulfones, perfluorocarbonic acid and styrene-divinylbenzene sulfonic acid.

27. The membrane of claim 20, further comprising a water adsorbent-free membrane layer on at least one face of said membrane film.

28. The membrane of claim 20, further comprising a water adsorbent-free membrane layer on each face of said membrane film.

29. The membrane of claim 20, wherein said water adsorbent particles are up to 3 microns in size.

30. A method of making a proton exchange membrane, comprising the steps of:
    dispersing a hydrogen oxidation catalyst on a plurality of water adsorbent particles; and
    casting said water adsorbent particles in a membrane film at a thickness of said film of about 10 times greater than a size of said particles.

31. The method according to claim 30, further comprising the steps of laminating a water adsorbent-free membrane layer on each face of said membrane film.

32. The method according to claim 30, wherein said water adsorbent particles include silica/alumina.

33. The method according to claim 32, wherein said silica/alumina is a zeolite.

34. The method according to claim 30, wherein said hydrogen oxidation catalyst is platinum.

35. The method according to claim 30, wherein said hydrogen oxidation catalyst is selected from the group consisting of platinum, gold, palladium, rhodium, iridium and ruthenium.

36. The method according to claim 30, wherein said membrane film is selected from the group consisting of perfluorocarbon sulfonic acid, polysulfones, pertfluorocarbonic acid and styrene-divinylbenzene sulfonic acid.

37. The membrane of claim 30, wherein said water adsorbent particles are up to 3 microns in size.

* * * * *